(12) United States Patent
Challenor

(10) Patent No.: US 12,715,586 B2
(45) Date of Patent: Aug. 25, 2026

(54) SEAT ASSEMBLY AND METHOD OF ASSEMBLING A SEAT

(71) Applicant: Mirus Aircraft Seating Ltd., Hingham (GB)

(72) Inventor: Adam Challenor, Hingham (GB)

(73) Assignee: Mirus Aircraft Seating Ltd., Hingham (GB)

( * ) Notice: Subject to any disclaimer, the term of this patent is extended or adjusted under 35 U.S.C. 154(b) by 87 days.

(21) Appl. No.: 18/741,894

(22) Filed: Jun. 13, 2024

(65) Prior Publication Data

US 2025/0019076 A1 Jan. 16, 2025

(30) Foreign Application Priority Data

Jul. 11, 2023 (GB) ...................................... 2310639
Mar. 25, 2024 (GB) ...................................... 2404245

(51) Int. Cl.
*B64D 11/06* (2006.01)

(52) U.S. Cl.
CPC .................................. *B64D 11/064* (2014.12)

(58) Field of Classification Search
CPC ......... B64D 11/064; B64D 11/06; B64F 5/10; B60N 2002/684; B60N 2/682
See application file for complete search history.

(56) References Cited

U.S. PATENT DOCUMENTS 5,700,058 A * 12/1997 Balagurumurthy .......................... B60N 2/42709 297/440.15
11,472,323 B2 * 10/2022 Modh .................... B60N 2/682
11,554,693 B2 * 1/2023 Macias .................. B60N 2/015
2014/0159449 A1 6/2014 Kämper
2015/0091342 A1 4/2015 Cailleteau et al.
(Continued)

FOREIGN PATENT DOCUMENTS

CN 110697052 A 1/2020
CN 216467455 U 5/2022
(Continued)

OTHER PUBLICATIONS

Great Britain Combined Search and Examination Report under Sections 17 & 18(3), Application No. GB2310639.6, dated Nov. 22, 2023.

(Continued)

*Primary Examiner* — J. T. Newton
(74) *Attorney, Agent, or Firm* — MacMillan, Sobanski & Todd, LLC

(57) ABSTRACT

A seat assembly includes a seat back assembly and a support frame having a first side rail and a second side rail. A first pin is connected to the first side rail of the support frame and includes a first cooperating formation, while a second pin connected to the second side rail of the support frame and includes a third cooperating formation, The seat back assembly includes a first opening formed in a first side of the seat back assembly for receiving the first pin, and an edge of the first opening includes a second cooperating formation corresponding to the first cooperating formation. A second opening is formed in a second side of the seat back assembly for receiving the second pin, and an edge of the second opening includes a fourth cooperating formation corresponding to the third corresponding formation.

20 Claims, 8 Drawing Sheets

(56) References Cited

U.S. PATENT DOCUMENTS

| | | | | |
|---|---|---|---|---|
| 2016/0185261 | A1* | 6/2016 | Hammann | B60N 2/3011 297/354.12 |
| 2022/0032826 | A1 | 2/2022 | Klitting et al. | |

FOREIGN PATENT DOCUMENTS

| | | | | |
|---|---|---|---|---|
| EP | 3222524 | A1 * | 9/2017 | B64D 11/064 |
| EP | 3944985 | A1 * | 2/2022 | B60N 2/22 |
| GB | 2548410 | A * | 9/2017 | B60N 2/01 |
| GB | 2619720 | A | 12/2023 | |
| KR | 101518627 | B1 | 5/2015 | |

OTHER PUBLICATIONS

Great Britain Combined Search and Examination Report under Sections 17 & 18(3), Application No. GB2404245.9, dated May 13, 2024.

The extended European search report, Application No. 24179037.7, dated Aug. 1, 2024.

* cited by examiner

Figure 6:
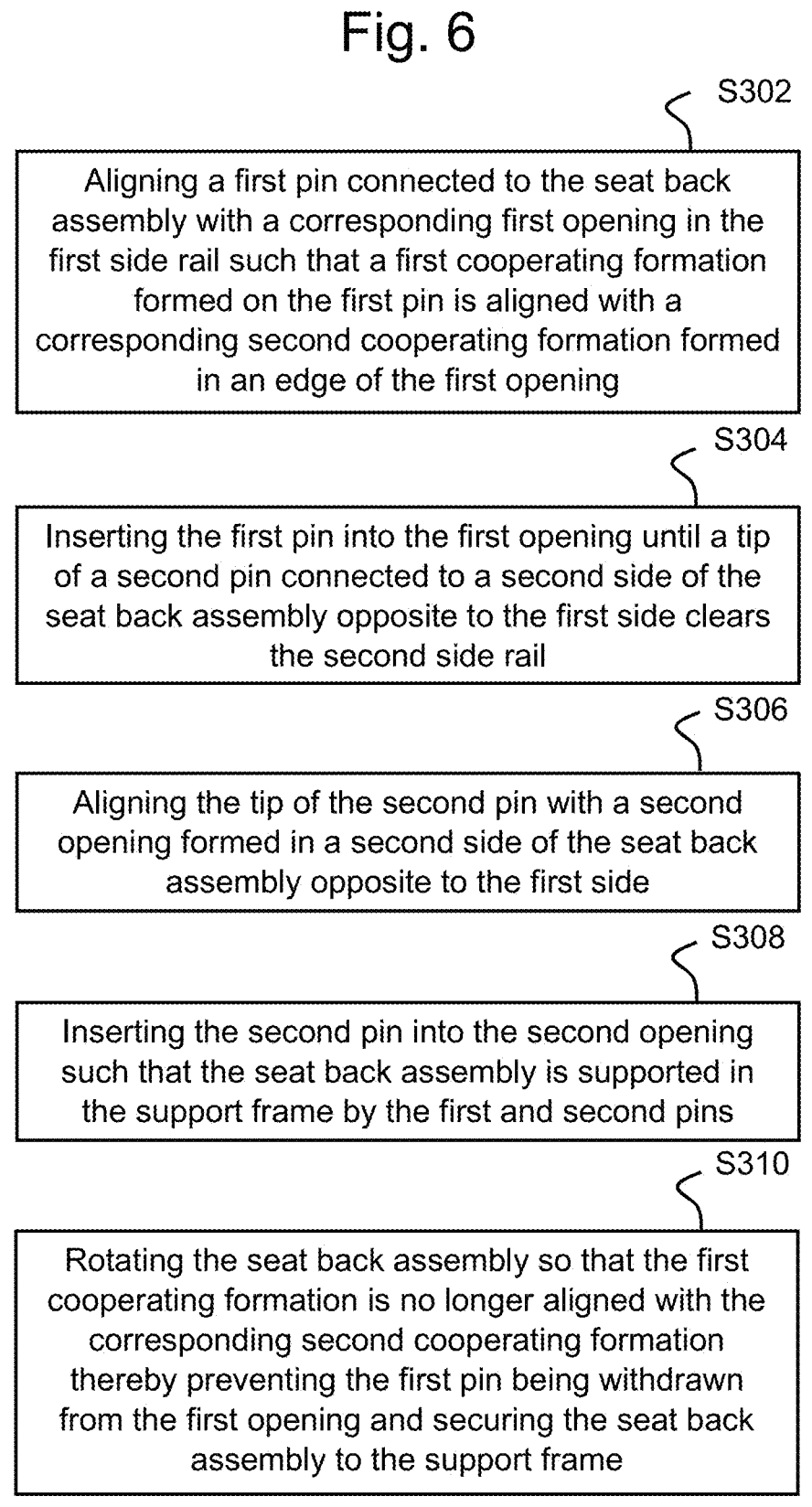

Aligning a first pin connected to the seat back assembly with a corresponding first opening in the first side rail such that a first cooperating formation formed on the first pin is aligned with a corresponding second cooperating formation formed in an edge of the first opening

S304

Inserting the first pin into the first opening until a tip of a second pin connected to a second side of the seat back assembly opposite to the first side clears the second side rail

S306

Aligning the tip of the second pin with a second opening formed in a second side of the seat back assembly opposite to the first side

S308

Inserting the second pin into the second opening such that the seat back assembly is supported in the support frame by the first and second pins

S310

Rotating the seat back assembly so that the first cooperating formation is no longer aligned with the corresponding second cooperating formation thereby preventing the first pin being withdrawn from the first opening and securing the seat back assembly to the support frame

SEAT ASSEMBLY AND METHOD OF ASSEMBLING A SEAT

BACKGROUND OF THE INVENTION

This invention relates in general to a seat assembly and a method of assembling a seat and is particularly, although not exclusive, concerned with a method of assembling a seat for a vehicle such as an aircraft.

Conventional aircraft seats have been designed to meet numerous requirements for safety and passenger comfort. The design of aircraft seating generally aims to reduce the weight and space occupied by the seats as well as providing seat assemblies which provide sufficient comfort and safety to an occupant.

However, these requirements can introduce complexities in the design of the seating which may make assembly of the seats within an aircraft complex and time consuming.

SUMMARY OF THE INVENTION

It is desirable to provide seat assemblies and methods of assembly that reduce the time taken to assemble the seat and enable easy replacement of parts.

According to an aspect of the present disclosure, there is provided a method of assembling a seat comprising a seat back assembly and a support frame, the support frame comprising a first side rail and a second side rail, the method comprising: aligning a first pin connected to the first side rail with a corresponding first opening in the seat back assembly such that a first cooperating formation formed on the first pin is aligned with a corresponding second cooperating formation formed in an edge of the first opening; inserting the first pin into the first opening until a tip of a second pin connected to the second side rail clears a second side of the seat back assembly opposite to the first side; aligning the tip of the second pin with a second opening formed in a second side of the seat back assembly opposite to the first side; inserting the second pin into the second opening such that the seat back assembly is supported in the support frame by the first and second pins; and rotating the seat back assembly so that the first cooperating formation is no longer aligned with the corresponding second cooperating formation thereby preventing the first pin being withdrawn from the first opening and securing the seat back assembly to the support frame.

This method provides a quick and efficient way to secure the seat back assembly in the support frame. The seat back assembly may be provided as a separate part to the rest of the seat assembly, where the seat back is then connected to the support frame via the first pin and the second pin. Such a configuration enables the seat to be provided in smaller, more easily maneuverable parts which enables easier transportation of the seat assemblies and improves ease of assembly. This configuration of parts and the ease with which the parts are assembled (and disassembled) also enables individual parts to be easily replaced when they become worn or damaged. This reduces wastage as only individual parts need be replaced rather than entire seat assemblies. The number of parts used in this seat back assembly is reduced when compared with alternative designs. No additional locking mechanisms are required as the pins can both support and lock the seat back assembly in the support frame.

The first cooperating formation may be a first lug formed on the first pin and the corresponding second cooperating formation may be a first recess formed in the edge of the first opening. Alternatively, the first cooperating formation may be a plurality of first lugs and the corresponding second cooperating formation may be a plurality of corresponding first recesses.

The second pin may comprise a third cooperating formation and the second opening may comprise a corresponding fourth cooperating formation. Like the first and second cooperating formations, the third cooperating formation may be one or more second lugs formed on the second pin and the corresponding fourth cooperating formation may be one or more second recesses formed in the edge of the second opening.

The first and second pins may each have two diametrically opposed lugs and the first and second openings may each have two diametrically opposed recesses.

The method of assembling the seat may further comprise the step of rotating the seat back assembly approximately 90 degrees from a position where the lugs and recesses are aligned to an installed position of the seat back assembly.

The first cooperating formation may alternatively be a first longitudinal groove formed on the first pin and the corresponding second cooperating formation may be a first projection extending from the edge of the first opening.

The method of assembling the seat back may further comprise an initial step of connecting the first pin to the first side rail for example by press fitting, gluing, welding, or brazing the first pin into a hole in the first side rail, thereby preventing movement of the first pin relative to the first side rail. Optionally the second pin may be connected to the second side rail in the same way.

The first and second pins may be connected to the respective side rails, thereby preventing movement of the pins relative to the support frame. Before fitting the pins, the pins may be rotated to ensure the lugs on the pins are in the correct orientation. Once oriented correctly, the pins may be interference fit, glued, welded, brazed, or otherwise fixed, thereby preventing the pins (and therefore the lugs) from rotating out of place.

The method may further comprise connecting a third pin connected to the support frame to a first lower seat fixing connected to the first side of the seat back assembly and connecting a fourth pin connected to the support frame to a second lower seat fixing connected to the second side of the seat back assembly.

According to another aspect, there is provided a seat assembly comprising a seat back assembly and a support frame, the support frame comprising a first side rail and a second side rail, the seat assembly further comprising: a first pin comprising a first lug, the first pin being connected to the first side rail of the support frame; a second pin comprising a second lug, the second pin being connected to the second side rail of the support frame; the seat back assembly comprising a first opening comprising a first recess corresponding to the first lug, the first opening being formed in a first side of the seat back assembly for receiving the first pin, and a second opening comprising a second recess corresponding to the second lug, the second opening being formed in a second side of the seat back assembly opposite the first side for receiving the second pin.

The first opening may be configured to receive the first pin when the seat back assembly is rotated to align the first recess with the first lug, and the second opening may be configured to receive the second pin when the seat back assembly is rotated to align the second recess with the second lug.

The seat back assembly may be rotatable around the first pin and second pins to a position where the first lug is no longer aligned with the first recess and optionally the second lug is no longer aligned with the second recess, thereby preventing the first pin from being withdrawn from the first opening and optionally preventing the second pin being withdrawn from the second opening.

The seat assembly may further comprise a third pin connected to the first side rail of the support frame and a fourth pin connected to the second side rail of the support frame. The seat assembly may further still comprise a first lower seat fixing connected to the first side of the seat back assembly and a second lower seat fixing connected to the second side of the seat back assembly. The third pin may be connected to the first lower seat fixing and the fourth pin may be connected to the second lower seat fixing.

In another aspect, there is provided a seat assembly comprising a seat back assembly and a support frame, the support frame comprising a first side rail and a second side rail, the seat assembly further comprising: a first pin comprising a first lug, the first pin being connected to the seat back assembly; a second pin comprising a second lug, the second pin being connected to a second side of the seat back assembly opposite to the first side; the support frame comprising a first opening comprising a first recess corresponding to the first lug, the first opening being formed in the first side rail for receiving the first pin, and a second opening comprising a second recess corresponding to the second lug, the second opening being formed in the second side rail for receiving the second pin.

In another aspect, there is provided a method of assembling a seat comprising a seat back assembly and a support frame, the support frame comprising a first side rail and a second side rail, the method comprising: aligning a first pin connected to the seat back assembly with a corresponding first opening in the first side rail such that a first cooperating formation formed on the first pin is aligned with a corresponding second cooperating formation formed in an edge of the first opening; inserting the first pin into the first opening until a tip of a second pin connected to a second side of the seat back assembly opposite to the first side clears the second side rail; aligning the tip of the second pin with a second opening formed in the second side of the seat back assembly opposite to the first side; inserting the second pin into the second opening such that the seat back assembly is supported in the support frame by the first and second pins; and rotating the seat back assembly so that the first cooperating formation is no longer aligned with the corresponding second cooperating formation thereby preventing the first pin being withdrawn from the first opening and securing the seat back assembly to the support frame.

The first and second pins may be connected to the sides of the seat back assembly for example by being interference fit into place, thereby preventing movement of the pins relative to the seat back assembly. Before fitting the pins, the pins may be rotated to ensure the lugs on the pins are in the correct orientation. Once oriented correctly, the pins may be interference fit, thereby preventing the pins (and therefore the lugs) from rotating out of place.

The pins herein may be connectable or dis-connectable (e.g., removeable, or replaceable) from both the seat back assembly and the support frame.

In a further aspect, there is provided seat assembly comprising a seat back assembly and a support frame, the support frame comprising a first side rail and a second side rail, the assembly further comprising: a first pin comprising a first cooperating formation, the first pin being connected to the first side rail of the support frame: a second pin comprising a third cooperating formation, the second pin being connected to the second side rail of the support frame; the seat back assembly comprising: a first opening formed in a first side of the seat back assembly for receiving the first pin, an edge of the first opening comprising a second cooperating formation corresponding to the first cooperating formation; and a second opening formed in a second side of the seat back assembly for receiving the second pin, an edge of the second opening comprising a fourth cooperating formation corresponding to the third corresponding formation.

To avoid unnecessary duplication of effort and repetition of text in the specification, certain features are described in relation to only one or several aspects or embodiments of the invention. However, it is to be understood that, where it is technically possible, features described in relation to any aspect or embodiment of the invention may also be used with any other aspect or embodiment of the invention.

BRIEF DESCRIPTION OF THE DRAWINGS

For a better understanding of the present invention, and to show more clearly how it may be carried into effect, reference will now be made, by way of example, to the accompanying drawings, in which:

FIG. 2 illustrates a method of assembly according to an example;

FIG. 6 illustrates a method of assembly according to a further example.

DETAILED DESCRIPTION OF THE PREFERRED EMBODIMENTS

As is described above, it is desirable to provide seat assemblies and methods of assembly thereof which enable efficient and easy installation of seats into vehicles such as aircraft.

Figure 1:
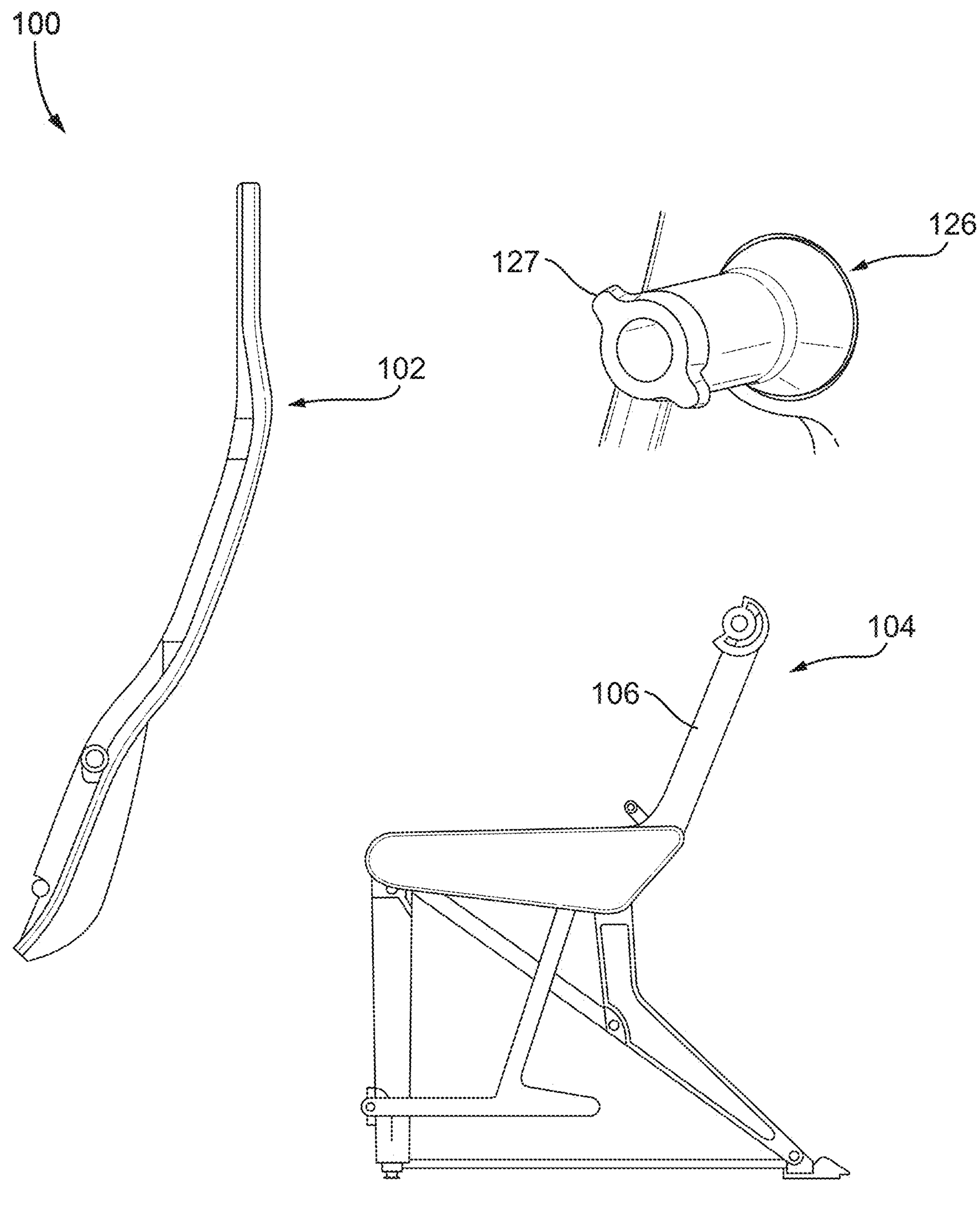
FIG. 1 illustrates a seat assembly to be assembled using the methods described herein.

FIG. 1 illustrates a seat assembly 100 comprising a seat back assembly 102 and support frame 104 according to an example. The support frame 104 comprises a first side rail 106 and a second side rail (not shown). The methods herein outline examples of methods of assembly for attaching the seat back assembly 102 to the support frame 104. One example of a method of assembly uses pins with lugs, such as the lugs 127 on the pin 126.

Figure 2:
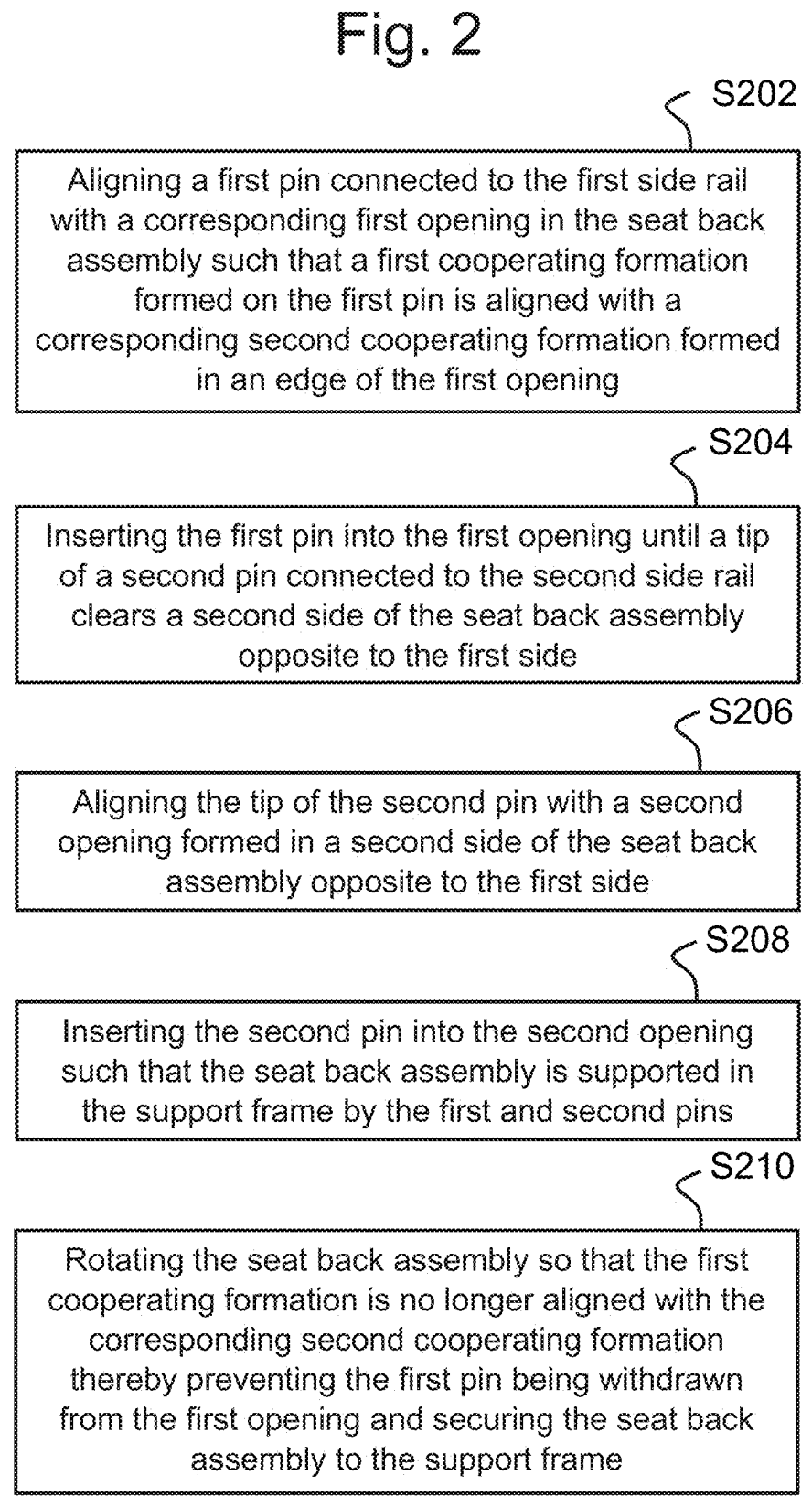

FIG. 2 outlines an example of a method of assembling a seat comprising the seat back and the support frame. FIGS. 3A-D show a partial view of the seat assembly 100 outlining the steps in assembly. FIGS. 4A-D are side-on views of the seat assembly 100 showing the rotation of the seat back assembly 102. Referring to FIGS. 3 and 4, the installation of the seat back as outlined in FIG. 2 is shown. In particular, FIG. 3 illustrates a seat assembly 100 comprising a seat back assembly 102 and a support frame 104. The support frame comprises a first side rail 106 and a second side rail 116.

Figure 3A:
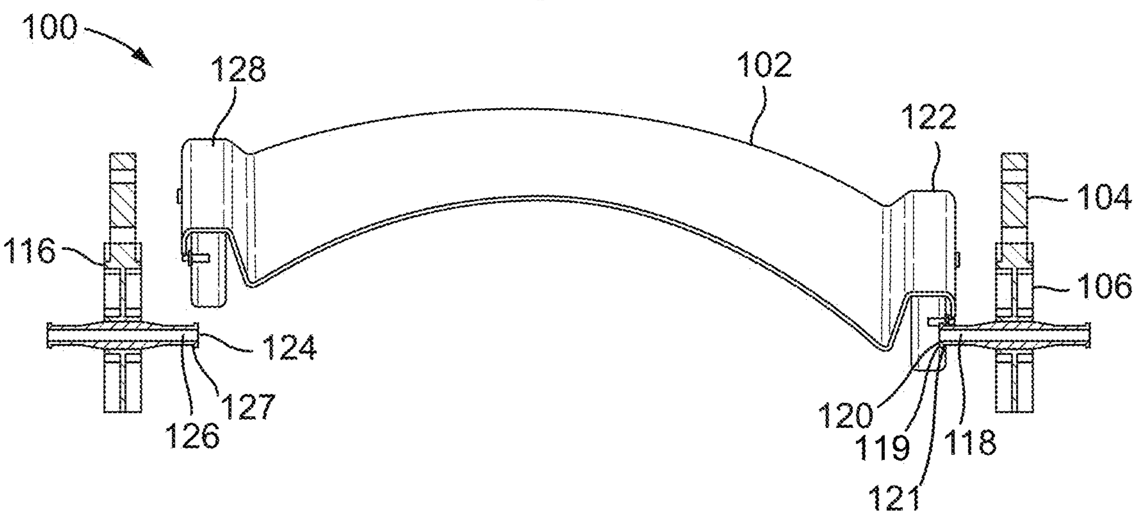
FIGS. 3A-3D illustrate a method of assembly according to an example.
Figure 4A:
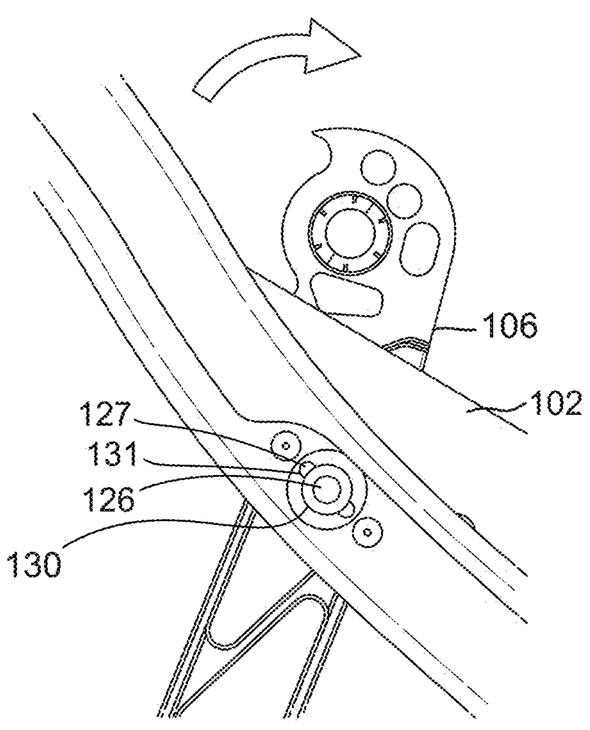
FIGS. 4A-4D illustrate a method of assembly according to an example.
Figure 4B:
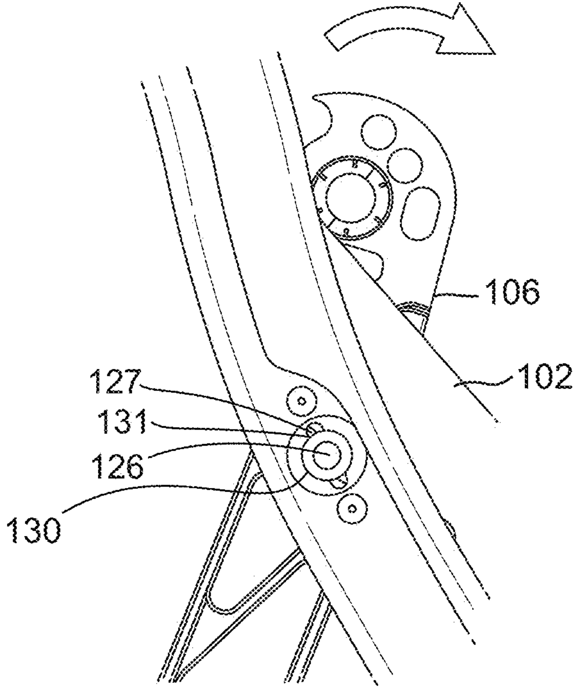
Figures 4C, 4D:
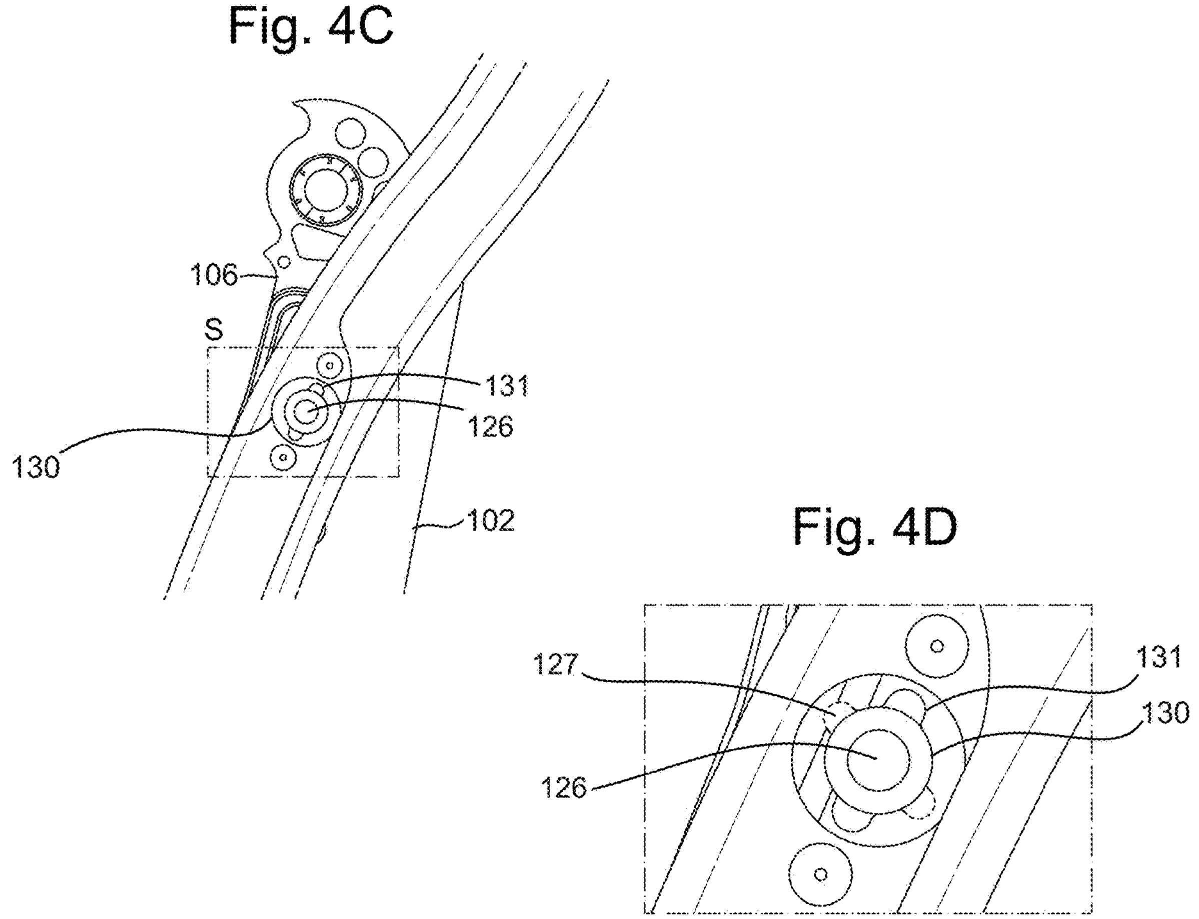

FIG. 3A illustrates the first two steps of the method, in which a first lug 119 on a first pin 118 is aligned with a corresponding first recess 121 in a first opening 120 formed in the first side 122 of the seat back assembly 102. Once aligned, the first pin 118 is connected to the first side rail 106 by inserting the first pin 118 into the first opening 120. The first pin 118 is inserted until a tip 124 of a second pin 126 connected to the second side rail 116 clears a second side wall 128 of the seat back assembly 102 opposite to the first side 122. In order for the tip 124 of the second pin 126 to clear the second side wall 128, it will be appreciated that the seat back assembly 102 may need to be deformed or flexed slightly. This flexing causes a temporary reduction in the distance between the first and second side walls 122, 128 of the seat back assembly 102, thus allowing the tip 124 to clear the second side wall 128. The concaved shape of the seat back assembly 102 ensures it flexes in a predicable, controllable way, thereby easing installation.

In some alternative embodiments, the seat back assembly 102 may instead be rigid, while at least one of the first and second side rails 106, 116 can be flexed apart from one another, widening the gap between them, so that the tip 124 can clear the second side wall 128. In further embodiments still, both the side rails 106, 116 and the seat back assembly 102 are flexed as described above in order for the tip 124 to clear the second side wall 128.

Figure 3B:
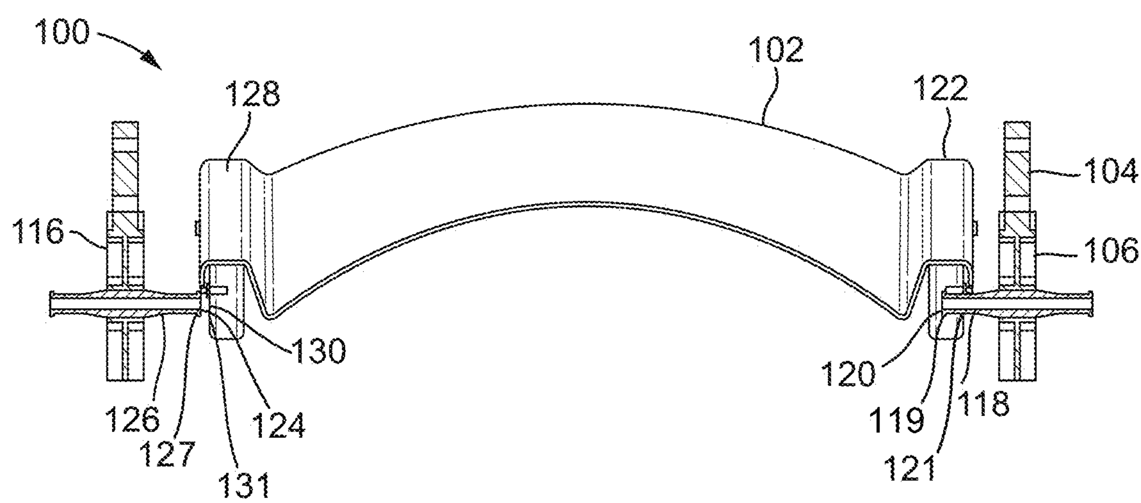

FIG. 3B illustrates the third step of the method, in which a second lug 127 of a second pin 126 is aligned with a second recess 131 formed on an edge of a second opening 130 formed in a second side wall 128 of the seat back assembly 102 opposite to the first side 122. It will be appreciated that the first pin 118 is over inserted in the first opening 120 in the step corresponding to FIG. 3B in order to allow the second pin 126 to be aligned with the second opening 130.

Figure 3C:
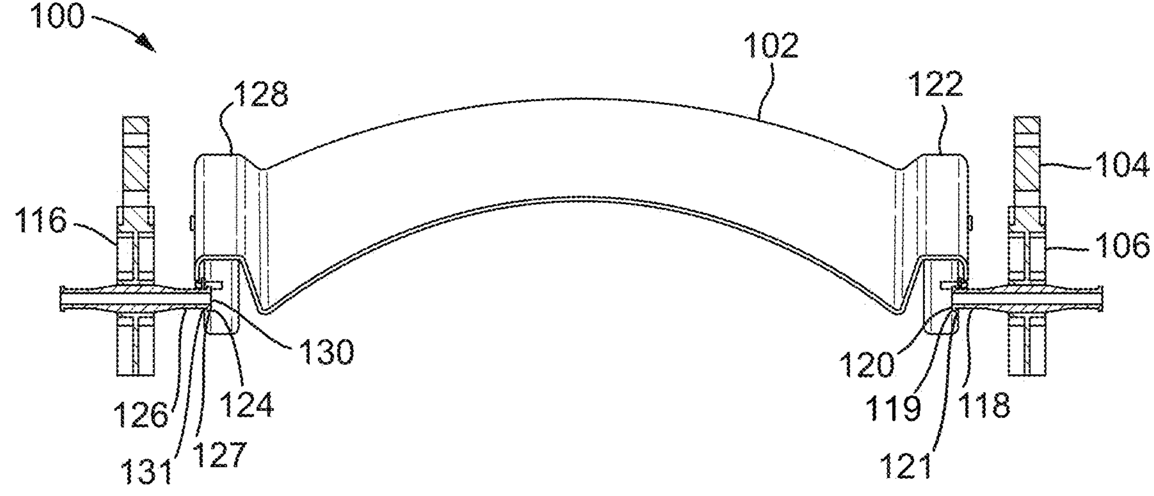

As shown in FIG. 3C, the first pin 118 is then withdrawn slightly from the first opening 120 as the second pin 126 is inserted into the second opening 130. At this point, the seat back assembly 102 is supported by the first pin 118 and the second pin 126. Once the pins 118, 126 are installed and the seat back assembly 102 is released, the seat back assembly 102 returns to its original, unflexed position.

Figure 3D:
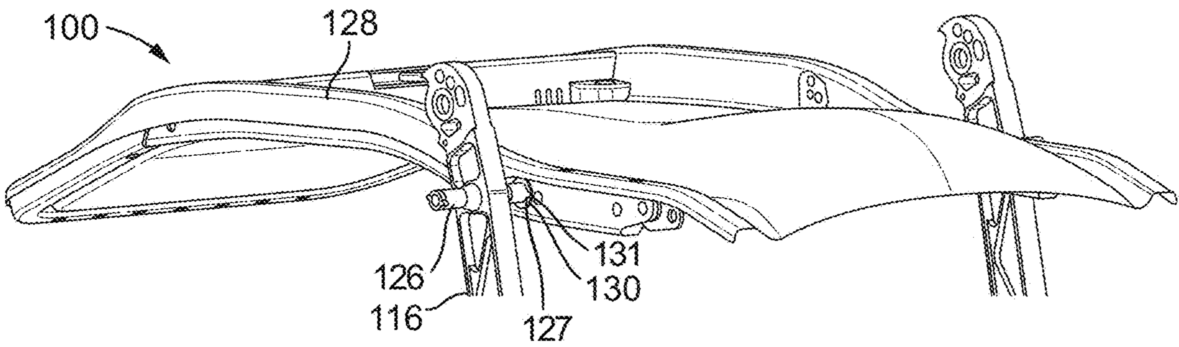

FIG. 3D shows a perspective view of the seat assembly 100 after the first pin (not shown) and the second pin 126 are installed in the first opening (not shown) and the second opening 130.

In some embodiments, the second pin 126 does not have a second lug 127 and the second opening 130 does not have a corresponding second recess 131. In these embodiments, at the step shown in FIG. 3B, a tip 124 of the second pin 126 is aligned with the second opening 130 and then the second pin 126 is inserted into the second opening 130. The rotational position of the second pin does not matter. In some embodiments, the pins 118, 126 have more than one lug each and the openings also have more than one corresponding recess. The embodiment shown in the Figures has two lugs and two recesses on each side of the seat assembly 100.

FIGS. 4A-D illustrate the process of rotating the seat back assembly 102 into its installed position, showing a side-on view of the second pin 126 and second side wall 128 of the seat back assembly 102. The description of these Figures will refer to the second opening 130, second pin 126, and second side wall 128 of the seat back assembly 102, though the rotation process also applies to the first opening 120, first pin 118, and first side 122.

FIG. 4A shows the configuration of the seat assembly 100 after the second pin 126 has been inserted into the second opening 130. As also shown, the lugs 127 of the second pin 126 are aligned with the recesses 131 on the second opening 130. The side wall 128 of the seat back assembly 102 is at least partially hollow. Therefore, once the second pin 126 is fully inserted into the second opening 130, the lugs 127 sit in the hollow space behind the side wall 128.

FIG. 4B shows the seat back assembly 102 in a position having been partially rotated backwards towards its installed position. As shown, the second lugs 127 begin to be obscured by the side wall 128 as the recesses 131 are rotated around the pin 126.

FIGS. 4C and 4D show the seat back assembly 102 rotated fully into the installed position. FIG. 4D is an enlargement of the section labelled 'S' in FIG. 4C. As can be seen, in this installed position the second lugs 127 (shown in dotted lines in FIG. 4D) are completely obscured behind the side wall 128 adjacent the second opening 130. Once the lugs 127 are blocked by the side wall 128, the pin 126 can no longer be removed from the second opening 130. Therefore, the seat back assembly 102 is locked securely to the support frame 104.

According to the installation method, and with reference to the embodiment shown in FIGS. 4A-D, the seat back assembly 102 must be rotated through approximately 90 degrees from its initial/alignment position to its installed/upright position. However, in other embodiments (at least partially dependent on the geometries of the lugs and recesses) the alignment position may be different. Therefore, the distance through which the seat back assembly 102 must rotate may also be different. Generally, the installed position of the seat back assembly 102 will be a position safe and comfortable for a passenger to use.

Typically, the dimensions of the lugs are such as to ensure they do not break during installation or normal use, leading to the seat back assembly 102 becoming unsecured. An exemplary pin may have a diameter of 14 mm with lugs that extend a further 2.9 mm from the surface of the pins. Lugs of this size may be 2.5 mm in width. Typical pins may be made from a metal such as aluminum. In some embodiments, the pins are made from 7050 aluminum, or another aluminum alloy typically used in aerospace applications. These dimensions and materials are exemplary, and many other suitable shapes, dimensions, and materials are applicable to the present invention. Indeed, in the embodiment shown in the Figures, each lug 119, 127 is semi-circular in shape. In other embodiments, the lugs may be a different shape such as square or triangular. In most cases, the shape of a recess which is intended to cooperate with a lug will closely match the cross-sectional shape of the lug. In some embodiments, where a pin has multiple lugs, the lugs may be different shapes.

Figure 5A:
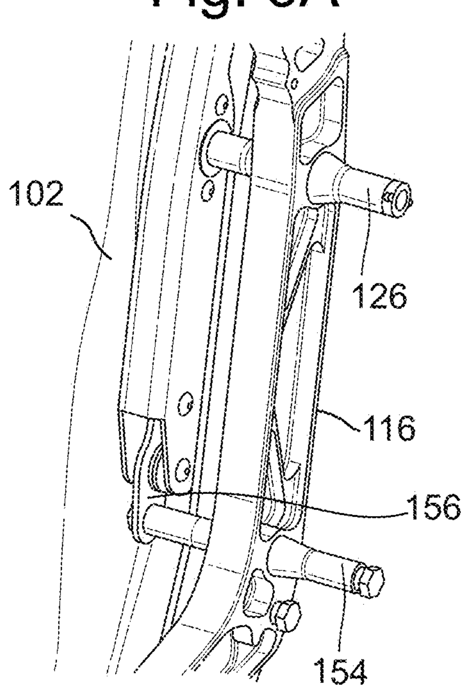
FIGS. 5A and 5B illustrate an assembled seat according to an example.
Figure 5B:
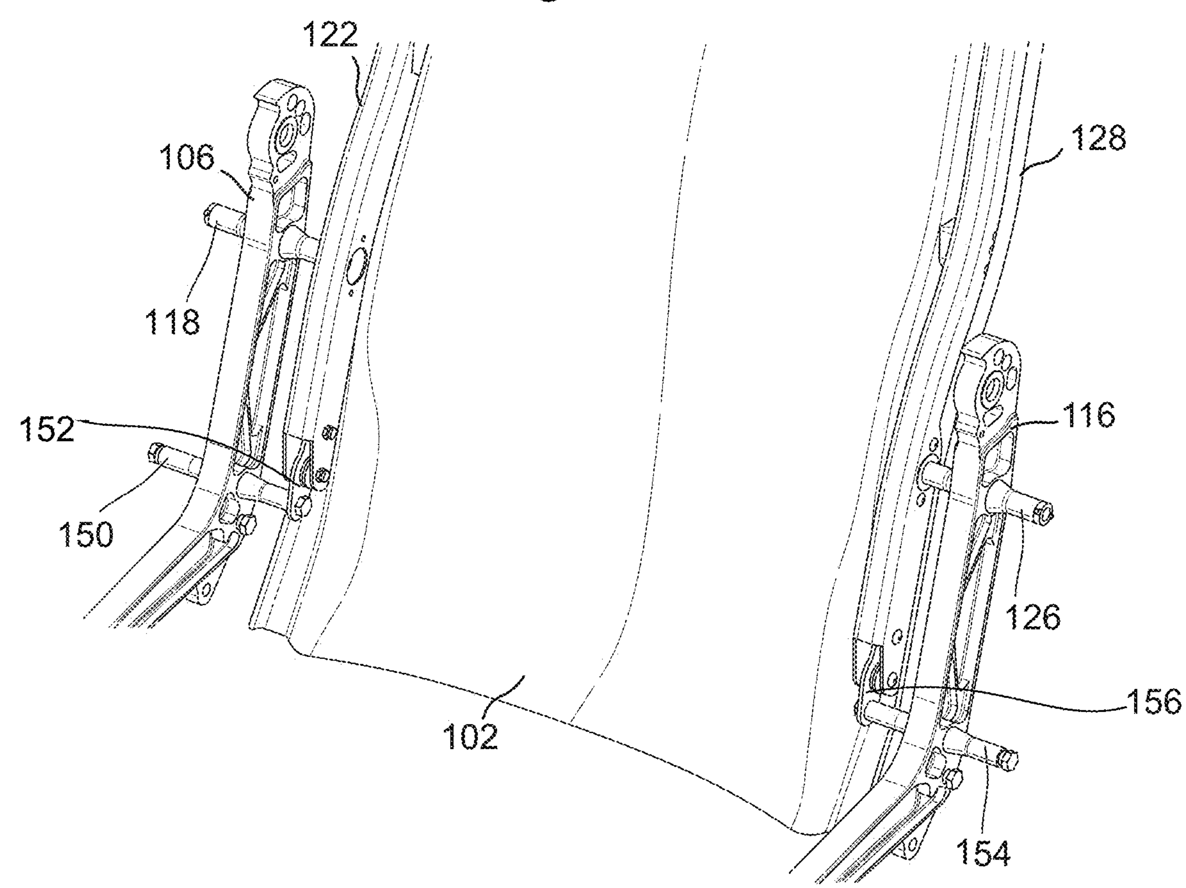

As FIGS. 5A and 5B show, in some embodiments the method of installation may also include connecting a third pin 150 connected to the first side rail 106 of the support frame 104 to a first lower seat fixing 152 connected to the first side 122 of the seat back assembly 102, and connecting a fourth pin 154 connected to the (second side rail 116 of the) support frame 104 to a second lower seat fixing 156 connected to the second side wall 128 of the seat back assembly 102. Thus, the seat back assembly 102 is fixed in an upright position. FIG. 5B shows the seat back assembly 102 in the upright/installed position with the third pin 150 and fourth pin 154 attaching the seat back assembly 102 to the support frame 104. These connections with the third and fourth pins 150, 154 are generally made once the seat back assembly 102 is in the installed/upright position. These third and fourth pins 150, 154 further constrain the motion of the seat back assembly 102, preventing it from rotating about the first and second pins 118, 126.

In some embodiments, instead of the pins 118, 126 comprising lugs 119, 127 and the openings 120, 130 having recesses 121, 131, the pins have longitudinal grooves running from their tips to at least part way up their length and the openings have projections extending from their edge. When installing a seat assembly 100 according to these embodiments, the method of doing so is different.

The alternative method comprises the steps of aligning a first longitudinal groove formed on a first pin connected to a first side rail with a corresponding first projection extending from an edge of a first opening in the seat back assembly, inserting the first pin into the first opening so that the first projection travels along the first longitudinal groove until the projection aligns with a circumferential groove formed in the first pin and until a tip of a second pin connected to the second side rail clears a second side of the seat back assembly opposite to the first side, aligning a second longitudinal groove formed on the second pin with a corresponding second projection extending from an edge of a second opening formed in a second side of the seat back assembly opposite to the first side, inserting the second pin into the second opening such that the seat back assembly is supported in the support frame by the first and second pins, and rotating the seat back assembly so that the first projection is no longer aligned with the first recess thereby preventing the first pin being withdrawn from the opening and securing the seat back assembly to the support frame. It will be appreciated that in order for the tip of the second pin to clear the second side of the seat back assembly, the seat back assembly and/or the side rails may be flexed slightly to provide more space for the alignment.

It will be understood that as the seat back assembly is rotated, the projections move through the circumferential groove. Once the projections and longitudinal grooves are no longer aligned, the projections are trapped inside the circumferential groove and, therefore, the pins cannot be removed from the seat back assembly 102. In some embodiments, the circumferential grooves only partially circumscribes the pins. In these cases, the end points of the circumferential grooves are used as end stops for the projections. Such end stops can be used to set the maximum rotational position of the seat back assembly 102 during installation.

In all cases, the longitudinal groove on each pin extends beyond the circumferential groove. This allows the respective projections to move into the part of the longitudinal groove which extends past the circumferential groove when the first pin in over inserted into the first opening to allow the second pin to be positioned correctly.

In some embodiments in accordance with this alternative method, each pin may have a plurality of longitudinal grooves which must each be aligned with a corresponding projection. In some other embodiments, only one of the pins has a groove or grooves which must be aligned with a projection or projections on the respective openings.

Additional statements of invention are set out below.

Statement 1. A method of assembling a seat comprising a seat back assembly and a support frame, the support frame comprising a first side rail and a second side rail, the method comprising:

- aligning a first pin connected to the first side rail with a corresponding first opening in the seat back assembly such that a first cooperating formation formed on the first pin is aligned with a corresponding second cooperating formation formed in an edge of the first opening;
- inserting the first pin into the first opening until a tip of a second pin connected to the second side rail clears a second side of the seat back assembly opposite to the first side;
- aligning the tip of the second pin with a second opening formed in a second side of the seat back assembly opposite to the first side;
- inserting the second pin into the second opening such that the seat back assembly is supported in the support frame by the first and second pins; and
- rotating the seat back assembly so that the first cooperating formation is no longer aligned with the corresponding second cooperating formation thereby preventing the first pin being withdrawn from the first opening and securing the seat back assembly to the support frame.

Statement 2. The method according to statement 1, wherein the first cooperating formation is a first lug formed on the first pin and the corresponding second cooperating formation is a first recess formed in the edge of the first opening.

Statement 3. The method according to statement 2, wherein the first cooperating formation is a plurality of first lugs and the corresponding second cooperating formation is a plurality of corresponding first recesses.

Statement 4. The method according to any of statements 2 or 3, wherein the second pin comprises a third cooperating formation and the second opening comprises a corresponding fourth cooperating formation.

Statement 5. The method according to statement 4, wherein the third cooperating formation is one or more second lugs formed on the second pin and the corresponding fourth cooperating formation is one or more second recesses formed in the edge of the second opening.

Statement 6. The method according to statement 5, wherein the first and second pins each have two diametrically opposed lugs and the first and second openings each have two diametrically opposed recesses.

Statement 7. The method according to statement 6, further comprising rotating the seat back assembly approximately 90 degrees from a position where the lugs and recesses are aligned to an installed position of the seat back assembly.

Statement 8. The method according to statement 1, wherein the first cooperating formation is a first longitudinal groove formed on the first pin and the corresponding second cooperating formation is a first projection extending from or adjacent the edge of the first opening.

Statement 9. The method according to any preceding statement, further comprising an initial step of connecting the first pin to the first side rail by press fitting the first pin into a hole in the first side rail, thereby preventing movement of the first pin relative to the first side rail, and optionally wherein the second pin is connected to the second side rail in the same way.

Statement 10. The method according to any preceding statement, further comprising connecting a third pin connected to the support frame to a first lower seat fixing connected to the first side of the seat back assembly and connecting a fourth pin connected to the support frame to a second lower seat fixing connected to the second side of the seat back assembly.

Statement 11. A seat assembly comprising a seat back assembly and a support frame, the support frame comprising a first side rail and a second side rail, the seat assembly further comprising:

- a first pin comprising a first lug, the first pin being connected to the first side rail of the support frame;
- a second pin comprising a second lug, the second pin being connected to the second side rail of the support frame;

the seat back assembly comprising a first opening comprising a first recess corresponding to the first lug, the first opening being formed in a first side of the seat back assembly for receiving the first pin, and a second opening comprising a second recess corresponding to the second lug, the second opening being formed in a second side of the seat back assembly opposite the first side for receiving the second pin.

Statement 12. The seat assembly according to statement 11, wherein the first opening is configured to receive the first pin when the seat back assembly is rotated to align the first recess with the first lug, and the second opening is configured to receive the second pin when the seat back assembly is rotated to align the second recess with the second lug.

Statement 13. The seat assembly according to any of statements 11-12, wherein the seat back assembly is rotatable around the first pin to a position where the first lug is no longer aligned with the first recess, thereby preventing the first pin from being withdrawn from the first opening.

Statement 14. The seat assembly according to any of statements 11-13, wherein the seat assembly further comprises a third pin connected to the first side rail of the support frame and a fourth pin connected to the second side rail of the support frame, and wherein the seat assembly further comprises a first lower seat fixing connected to the first side of the seat back assembly and a second lower seat fixing connected to the second side of the seat back assembly, and wherein the third pin is connected to the first lower seat fixing and the fourth pin is connected to the second lower seat fixing.

Statement 15. A seat assembly comprising a seat back assembly and a support frame, the support frame comprising a first side rail and a second side rail, the seat assembly further comprising:

a first pin comprising a first lug, the first pin being connected to the seat back assembly;

a second pin comprising a second lug, the second pin being connected to a second side of the seat back assembly opposite to the first side;

the support frame comprising a first opening comprising a first recess corresponding to the first lug, the first opening being formed in the first side rail for receiving the first pin, and a second opening comprising a second recess corresponding to the second lug, the second opening being formed in the second side rail for receiving the second pin.

Statement 16. A method of assembling a seat comprising a seat back assembly and a support frame, the support frame comprising a first side rail and a second side rail, the method comprising:

aligning a first pin connected to the seat back assembly with a corresponding first opening in the first side rail such that a first cooperating formation formed on the first pin is aligned with a corresponding second cooperating formation formed in an edge of the first opening;

inserting the first pin into the first opening until a tip of a second pin connected to a second side of the seat back assembly opposite to the first side clears the second side rail;

aligning the tip of the second pin with a second opening formed in the second side of the seat back assembly opposite to the first side;

inserting the second pin into the second opening such that the seat back assembly is supported in the support frame by the first and second pins; and rotating the seat back assembly so that the first cooperating formation is no longer aligned with the corresponding second cooperating formation thereby preventing the first pin being withdrawn from the first opening and securing the seat back assembly to the support frame.

Statement 17. A method of assembling a seat comprising a seat back assembly and a support frame, the support frame comprising a first side rail and a second side rail, the method comprising:

aligning a first pin connected to the seat back assembly with a corresponding first opening in the first side rail such that a first cooperating formation formed on the first pin is aligned with a corresponding second cooperating formation formed in an edge of the first opening;

inserting the first pin into the first opening until a tip of a second pin connected to a second side of the seat back assembly opposite to the first side clears the second side rail;

aligning the tip of the second pin with a second opening formed in the second side rail opposite to the first side rail;

inserting the second pin into the second opening such that the seat back assembly is supported in the support frame by the first and second pins; and rotating the seat back assembly so that the first cooperating formation is no longer aligned with the corresponding second cooperating formation thereby preventing the first pin being withdrawn from the first opening and securing the seat back assembly to the support frame.

It will be appreciated by those skilled in the art that although the invention has been described by way of example, with reference to one or more exemplary examples, it is not limited to the disclosed examples and that alternative examples could be constructed without departing from the scope of the invention as defined by the appended claims.

What is claimed is:

1. A method of assembling a seat comprising a seat back assembly and a support frame, the seat back assembly comprising a first side and a second side, the support frame comprising a first side rail and a second side rail, the method comprising:

aligning a first pin connected to the first side rail with a corresponding first opening formed in the first side of the seat back assembly such that a first cooperating formation formed on the first pin is aligned with a corresponding second cooperating formation formed in an edge of the first opening;

inserting the first pin into the first opening until a tip of a second pin connected to the second side rail clears the second side of the seat back assembly opposite to the first side;

aligning the tip of the second pin with a second opening formed in the second side of the seat back assembly opposite to the first side;

inserting the second pin into the second opening such that the seat back assembly is supported in the support frame by the first and second pins; and rotating the seat back assembly so that the first cooperating formation is no longer aligned with the corresponding second cooperating formation thereby preventing the first pin being withdrawn from the first opening and securing the seat back assembly to the support frame.

2. The method according to claim 1, wherein the first cooperating formation is a first lug formed on the first pin and the corresponding second cooperating formation is a first recess formed in the edge of the first opening.

3. The method according to claim 2, wherein the first cooperating formation is a plurality of first lugs and the corresponding second cooperating formation is a plurality of corresponding first recesses.

4. The method according to claim 2, wherein the second pin comprises a third cooperating formation and the second opening comprises a corresponding fourth cooperating formation.

5. The method according to claim 4, wherein the third cooperating formation is one or more second lugs formed on the second pin and the corresponding fourth cooperating formation is one or more second recesses formed in the edge of the second opening.

6. The method according to claim 5, wherein the first and second pins each have two diametrically opposed lugs and the first and second openings each have two diametrically opposed recesses.

7. The method according to claim 6, further comprising rotating the seat back assembly approximately 90 degrees from a position where the lugs and recesses are aligned to an installed position of the seat back assembly.

8. The method according to claim 1, wherein the first cooperating formation is a first longitudinal groove formed on the first pin and the corresponding second cooperating formation is a first projection extending from or adjacent the edge of the first opening.

9. The method according to claim 1, further comprising an initial step of connecting the first pin to the first side rail by press fitting the first pin into a hole in the first side rail, thereby preventing movement of the first pin relative to the first side rail, and optionally wherein the second pin is connected to the second side rail in the same way.

10. The method as claimed in claim 1, further comprising connecting a third pin connected to the support frame to a first lower seat fixing connected to the first side of the seat back assembly and connecting a fourth pin connected to the support frame to a second lower seat fixing connected to the second side of the seat back assembly.

11. A seat assembly comprising a seat back assembly and a support frame, the support frame comprising a first side rail and a second side rail, the seat assembly further comprising:

a first pin comprising a first lug, the first pin being connected to the first side rail of the support frame;

a second pin comprising a second lug, the second pin being connected to the second side rail of the support frame;

the seat back assembly comprising a first opening comprising a first recess corresponding to the first lug, the first opening being formed in a first side of the seat back assembly for receiving the first pin, and a second opening comprising a second recess corresponding to the second lug, the second opening being formed in a second side of the seat back assembly opposite the first side for receiving the second pin, wherein the first opening is configured to receive the first pin when the seat back assembly is rotated to align the first recess with the first lug, and the second opening is configured to receive the second pin when the seat back assembly is rotated to align the second recess with the second lug.

12. A seat assembly comprising a seat back assembly and a support frame, the support frame comprising a first side rail and a second side rail, the seat assembly further comprising:

a first pin comprising a first lug, the first pin being connected to the first side rail of the support frame;

a second pin comprising a second lug, the second pin being connected to the second side rail of the support frame;

the seat back assembly comprising a first opening comprising a first recess corresponding to the first lug, the first opening being formed in a first side of the seat back assembly for receiving the first pin, and a second opening comprising a second recess corresponding to the second lug, the second opening being formed in a second side of the seat back assembly opposite the first side for receiving the second pin, wherein the seat back assembly is rotatable around the first pin to a position where the first lug is no longer aligned with the first recess, thereby preventing the first pin from being withdrawn from the first opening.

13. A seat assembly comprising a seat back assembly and a support frame, the support frame comprising a first side rail and a second side rail, the seat assembly further comprising:

a first pin comprising a first lug, the first pin being connected to the first side rail of the support frame;

a second pin comprising a second lug, the second pin being connected to the second side rail of the support frame;

the seat back assembly comprising a first opening comprising a first recess corresponding to the first lug, the first opening being formed in a first side of the seat back assembly for receiving the first pin, and a second opening comprising a second recess corresponding to the second lug, the second opening being formed in a second side of the seat back assembly opposite the first side for receiving the second pin, wherein the seat assembly further comprises a third pin connected to the first side rail of the support frame and a fourth pin connected to the second side rail of the support frame, and wherein the seat assembly further comprises a first lower seat fixing connected to the first side of the seat back assembly and a second lower seat fixing connected to the second side of the seat back assembly, and wherein the third pin is connected to the first lower seat fixing and the fourth pin is connected to the second lower seat fixing.

14. A seat assembly comprising a seat back assembly and a support frame, the support frame comprising a first side rail and a second side rail, the seat assembly further comprising:

a first pin comprising a first lug, the first pin being connected to the seat back assembly;

a second pin comprising a second lug, the second pin being connected to a second side of the seat back assembly opposite to the first side;

the support frame comprising a first opening comprising a first recess corresponding to the first lug, the first opening being formed in the first side rail for receiving the first pin, and a second opening comprising a second recess corresponding to the second lug, the second opening being formed in the second side rail for receiving the second pin, wherein the seat back assembly is rotatable to a position where the first lug is no longer aligned with the first recess, thereby preventing the first pin from being withdrawn from the first opening.

15. A method of assembling a seat comprising a seat back assembly and a support frame, the seat back assembly comprising a first side and a second side, the support frame comprising a first side rail and a second side rail, the method comprising:

aligning a first pin connected to the first side of the seat back assembly with a corresponding first opening in the first side rail such that a first cooperating formation formed on the first pin is aligned with a corresponding second cooperating formation formed in an edge of the first opening;

inserting the first pin into the first opening until a tip of a second pin connected to the second side of the seat back assembly opposite to the first side clears the second side rail;

aligning the tip of the second pin with a second opening formed in the second side rail opposite to the first side rail;

inserting the second pin into the second opening such that the seat back assembly is supported in the support frame by the first and second pins; and rotating the seat back assembly so that the first cooperating formation is no longer aligned with the corresponding second cooperating formation thereby preventing the first pin being withdrawn from the first opening and securing the seat back assembly to the support frame.

16. The method according to claim 15, wherein the second pin comprises a third cooperating formation and the second opening comprises a corresponding fourth cooperating formation.

17. The method according to claim 16, wherein the third cooperating formation is one or more second lugs formed on the second pin and the corresponding fourth cooperating formation is one or more second recesses formed in the edge of the second opening.

18. The method according to claim 17, wherein the first and second pins each have two diametrically opposed lugs and the first and second openings each have two diametrically opposed recesses.

19. The method according to claim 18, further comprising rotating the seat back assembly approximately 90 degrees from a position where the lugs and recesses are aligned to an installed position of the seat back assembly.

20. The method according to claim 19, further comprising an initial step of connecting the first pin to the first side of the seat back assembly by press fitting the first pin into a hole in the first side of the seat back assembly, thereby preventing movement of the first pin relative to the first side of the seat back assembly, and optionally wherein the second pin is connected to the second side of the seat back assembly in the same way.

* * * * *